United States Patent
Miller et al.

(10) Patent No.: US 8,024,069 B2
(45) Date of Patent: Sep. 20, 2011

(54) SYSTEM AND METHOD FOR PATH PLANNING

(75) Inventors: Daniel H. Miller, Charlottesville, VA (US); William Lindsay Morrison, Charlottesville, VA (US)

(73) Assignee: GE Intelligent Platforms, Inc., Charlottesville, VA (US)

( * ) Notice: Subject to any disclaimer, the term of this patent is extended or adjusted under 35 U.S.C. 154(b) by 495 days.

(21) Appl. No.: 12/361,170

(22) Filed: Jan. 28, 2009

(65) Prior Publication Data
US 2010/0191351 A1 Jul. 29, 2010

(51) Int. Cl.
G05B 19/04 (2006.01)
G05B 19/18 (2006.01)
G01C 22/00 (2006.01)
G01C 21/00 (2006.01)
G01C 21/30 (2006.01)
G01C 21/32 (2006.01)
G01C 9/00 (2006.01)
G01C 17/00 (2006.01)
G01C 19/00 (2006.01)
G05D 1/02 (2006.01)
G06F 17/10 (2006.01)
G06G 7/78 (2006.01)

(52) U.S. Cl. ............ 700/253; 700/62; 700/63; 700/64; 700/254; 701/26; 701/202; 701/204; 701/210; 701/300; 702/150

(58) Field of Classification Search .................. 700/56, 700/61–64, 245, 246, 250, 253–255; 701/2, 701/23, 25, 26, 200–202, 204, 207, 209, 701/210, 300, 301; 702/127, 150; 318/162, 318/163, 560, 561, 567, 568.11, 568.12, 318/575, 580; 342/350, 352, 357.2, 357.39, 342/357.4, 357.42; 345/418, 473, 474
See application file for complete search history.

(56) References Cited

U.S. PATENT DOCUMENTS 3,566,280 A 2/1971 Emmons
4,769,583 A 9/1988 Goor
(Continued)

FOREIGN PATENT DOCUMENTS
DE 10221062 A1 12/2002
(Continued)

Primary Examiner — Crystal J Barnes-Bullock
(74) Attorney, Agent, or Firm — GE Global Patent Operation; Mark Conklin

(57) ABSTRACT

A method for mapping a motion of a first object within a first motion path defined by a path planner based on a second motion path of a second object. The method includes creating the first motion path for the first object using the path planner, initializing a start position of the first object within the first motion path, determining a value for an initial condition for each segment of a plurality of segments in the first motion path created by the path planner, and calculating an elapsed time between a current sample call time to the path planner and a last sample call time to the path planner. If the calculated elapsed time is one of greater than and less than a sample period, a current location of the second object in the second motion path is determined utilizing the calculated elapsed time, an expired time within a first segment of the plurality if segments between a start time of the first segment and the current sample call time is calculated, and an output command is generated from the path planner. Execution of the generated output command alters the first motion path.

17 Claims, 3 Drawing Sheets

U.S. PATENT DOCUMENTS

| | | | |
|---|---|---|---|
| 5,006,850 | A | 4/1991 | Murphy |
| 5,046,022 | A * | 9/1991 | Conway et al. ............... 700/250 |
| 5,391,970 | A | 2/1995 | Chaffee |
| 5,434,489 | A | 7/1995 | Cheng |
| 5,463,296 | A | 10/1995 | Fugere |
| 5,600,221 | A | 2/1997 | Tomatsuri |
| 5,634,138 | A | 5/1997 | Ananthan |
| 5,642,024 | A | 6/1997 | Okada |
| 5,689,161 | A | 11/1997 | Fugere |
| 5,859,742 | A * | 1/1999 | Takaishi ..................... 360/78.01 |
| 5,923,132 | A | 7/1999 | Boyer |
| 5,983,024 | A | 11/1999 | Fye |
| 6,049,739 | A | 4/2000 | Melvin |
| 6,216,058 | B1 | 4/2001 | Hosek |
| 6,322,733 | B1 * | 11/2001 | Herbst ......................... 264/40.5 |
| 6,340,947 | B1 * | 1/2002 | Chang et al. ............. 342/357.43 |
| 6,427,099 | B1 | 7/2002 | Heinemann |
| 6,442,442 | B1 | 8/2002 | Weinhofer |
| 6,449,677 | B1 | 9/2002 | Olarig |
| 6,493,607 | B1 * | 12/2002 | Bourne et al. ................ 700/255 |
| 6,587,574 | B1 * | 7/2003 | Jeannin ......................... 382/107 |
| 6,779,174 | B2 | 8/2004 | Amrhein |
| 6,865,441 | B2 | 3/2005 | Chandhoke |
| 6,945,260 | B1 * | 9/2005 | Stocchi et al. ................. 134/62 |
| 7,026,779 | B2 | 4/2006 | Eba |
| 7,053,830 | B2 * | 5/2006 | Krumm et al. ................ 342/451 |
| 7,129,951 | B2 * | 10/2006 | Stelly, III ...................... 345/474 |
| 7,180,253 | B2 | 2/2007 | Weinhofer |
| 7,208,898 | B2 * | 4/2007 | Stoecker et al. .............. 318/561 |
| 7,212,134 | B2 * | 5/2007 | Taylor ........................... 340/901 |
| 7,228,294 | B2 | 6/2007 | Nagamatsu |
| 7,313,404 | B2 * | 12/2007 | Anderson .................. 455/456.1 |
| 7,447,593 | B2 * | 11/2008 | Estkowski et al. ............. 701/301 |
| 7,788,071 | B2 * | 8/2010 | Bond et al. ........................ 703/6 |
| 7,822,461 | B2 * | 10/2010 | Geiger et al. .................. 600/415 |
| 7,826,971 | B2 * | 11/2010 | Fontaine et al. .............. 701/301 |
| 7,873,469 | B2 * | 1/2011 | D'Andrea et al. ............ 701/209 |
| 7,919,940 | B2 * | 4/2011 | Miller et al. ................... 318/163 |
| 2006/0149496 | A1 * | 7/2006 | Takeuchi ........................ 702/150 |
| 2008/0027591 | A1 * | 1/2008 | Lenser et al. ....................... 701/2 |
| 2008/0249662 | A1 * | 10/2008 | Nakamura .................... 700/253 |
| 2009/0059007 | A1 * | 3/2009 | Wagg et al. .................... 348/157 |
| 2009/0105883 | A1 * | 4/2009 | Miller et al. ................... 700/275 |
| 2009/0109567 | A1 * | 4/2009 | Ishihara et al. ............ 360/78.06 |
| 2009/0312867 | A1 * | 12/2009 | Hasegawa et al. ............ 700/245 |
| 2010/0185411 | A1 * | 7/2010 | Pfeiffer et al. ................ 702/150 |

FOREIGN PATENT DOCUMENTS

| | | |
|---|---|---|
| EP | 0919926 B1 | 2/2003 |
| WO | 85/05707 | 12/1985 |
| WO | 00/73967 | 7/2000 |

* cited by examiner

SYSTEM AND METHOD FOR PATH PLANNING

BACKGROUND OF THE INVENTION

The embodiments described herein relate generally to a system and method for path planning and, more particularly, to a system and method for mapping a motion of an object within a motion path defined by a path planner.

Conventional motion control systems include a motion controller that provides a signal to a motor driver that activates a motor to turn. As a feedback device, a pulse encoder creates a discrete pulse for every unit of motion that occurs and transmits the pulse back to the motion controller. This is referred to as a motion event. Such conventional motion control systems accumulate motion events only over a fixed sample period. Therefore, conventional motion events are only identified as occurring over a fixed sample period.

A path planner may be required to run periodically, such as every 1 millisecond (ms), in order to accumulate motion events over one or more fixed sample periods (e.g., if the motion system is accumulating pulses over a sample period of 1 ms). An additional task of the motion control system that requires more than 1 ms to plan a path for a sample period may starve the path planner of computation. For example, a computer in a car may be interfacing with a Global Position System (GPS) as well as generating a path for the car via a path planner. Each of the GPS and the path planner are time critical tasks that are required to run every 1 ms for the motion control system to work correctly. However, if, for example, the GPS requires more than 1 ms to calculate coordinates for a sample period, the path planner, which is required to run every 1 ms, is then starved of computation. Thus, the path planner cannot run properly because the path planner does not have an understanding of a sample period not occurring on a 1 ms interval and the process must be aborted as the motion control system can no longer determine a proper location.

BRIEF DESCRIPTION OF THE INVENTION

In one aspect, a method is provided for mapping a motion of a first object within a first motion path defined by a path planner based on a second motion path of a second object. The method includes creating the first motion path for the first object using the path planner, initializing a start position of the first object within the first motion path, determining a value for an initial condition for each segment of a plurality of segments in the first motion path created by the path planner, and calculating an elapsed time between a current sample call time to the path planner and a last sample call time to the path planner. If the calculated elapsed time is one of greater than and less than a sample period, a current location of the second object in the second motion path is determined utilizing the calculated elapsed time, an expired time within a first segment of the plurality of segments between a start time of the first segment and the current sample call time is calculated, and an output command is generated from the path planner. Execution of the generated output command alters the first motion path.

In another aspect, a system for mapping continuous time kinematic motion equations into a discrete time domain is provided. The system includes a memory area for storing path planner information including an initial time a path was planned and an initial condition of a plurality of segments in the path that are defined by discontinuities introduced by the continuous time kinematic motion equations, and a processor. The processor is programmed to create the first motion path for a first object using the path planner based on a second motion path of a second object, initialize a start position of the first object within the first motion path, determine a value for an initial condition for each segment of a plurality of segments in the first motion path created by the path planner, and calculate an elapsed time between a current sample call time to the path planner and a last sample call time to the path planner. If the calculated elapsed time is one of greater than and less than a sample period, a current location of the second object in the second motion path is determined utilizing the calculated elapsed time, an expired time within a first segment of the plurality of segments between a start time of the first segment and the current sample call time is calculated, and an output command is generated from the path planner. Execution of the generated output command alters the first motion path.

In yet another aspect, a computer readable medium storing a program instructing a computer to perform a method for method for mapping continuous time kinematic motion equations into a discrete time domain is provided. The instructions include creating a first motion path for a first object using a path planner, initializing a start position of the first object within the first motion path, determining a value for an initial condition for each segment of a plurality of segments in the first motion path created by the path planner, and calculating an elapsed time between a current sample call time to the path planner and a last sample call time to the path planner. If the calculated elapsed time is one of greater than and less than a sample period, a current location of the second object in the second motion path is determined utilizing the calculated elapsed time, an expired time within a first segment of the plurality of segments between a start time of the first segment and the current sample call time is calculated, and an output command is generated from the path planner. Execution of the generated output command alters the first motion path.

BRIEF DESCRIPTION OF THE DRAWINGS

The present disclosure is described in detail below with reference to the attached figures.

DETAILED DESCRIPTION OF THE INVENTION

Herein described are systems and methods for mapping continuous time kinematic motion equations into a discrete time domain to yield systems and methods that provide flexibility necessary to support non-homogeneous sample periods, and further allow for discontinuities in equation sets to occur such that there is an allowance for a move to start at a user specified time that is not constrained to a multiple of sample periods.

The systems and methods for mapping continuous time kinematic motion equations into a discrete time domain described herein provide many advantages over current motion systems and methods that utilize kinematic equations for generating motion trajectories. For example, mapping continuous time kinematic motion equations into a discrete time domain does not require a fixed sample time and allows a path planner to calculate motion trajectories that do not start at a beginning of a sample period. Therefore, it is not necessary for a transition from one motion segment to another motion segment to occur at a beginning of a sample period. As such, the systems and methods described herein support non-homogenous sample periods without compromising a generated path. Therefore, a controller can manage a computational load associated with path generation by skipping a sample period, or if required, run at non-uniform rates. This allows an application as a whole to manage a computational load yielding systems and methods that can balance cost versus functionality. Further, generating trajectories that are not required to start at a beginning of a sample period provides a user with precise control of acceleration/velocity/position relationships while a move is in progress. Such control results in tighter tolerances for interactions between a controlled device while the controlled device is in operation.

Although the systems and methods described herein are in context of a motion control system, one of ordinary skill in the art will appreciate that the systems and methods described herein can also be used for measuring motion without using the information directly for control of an object.

Figure 1:
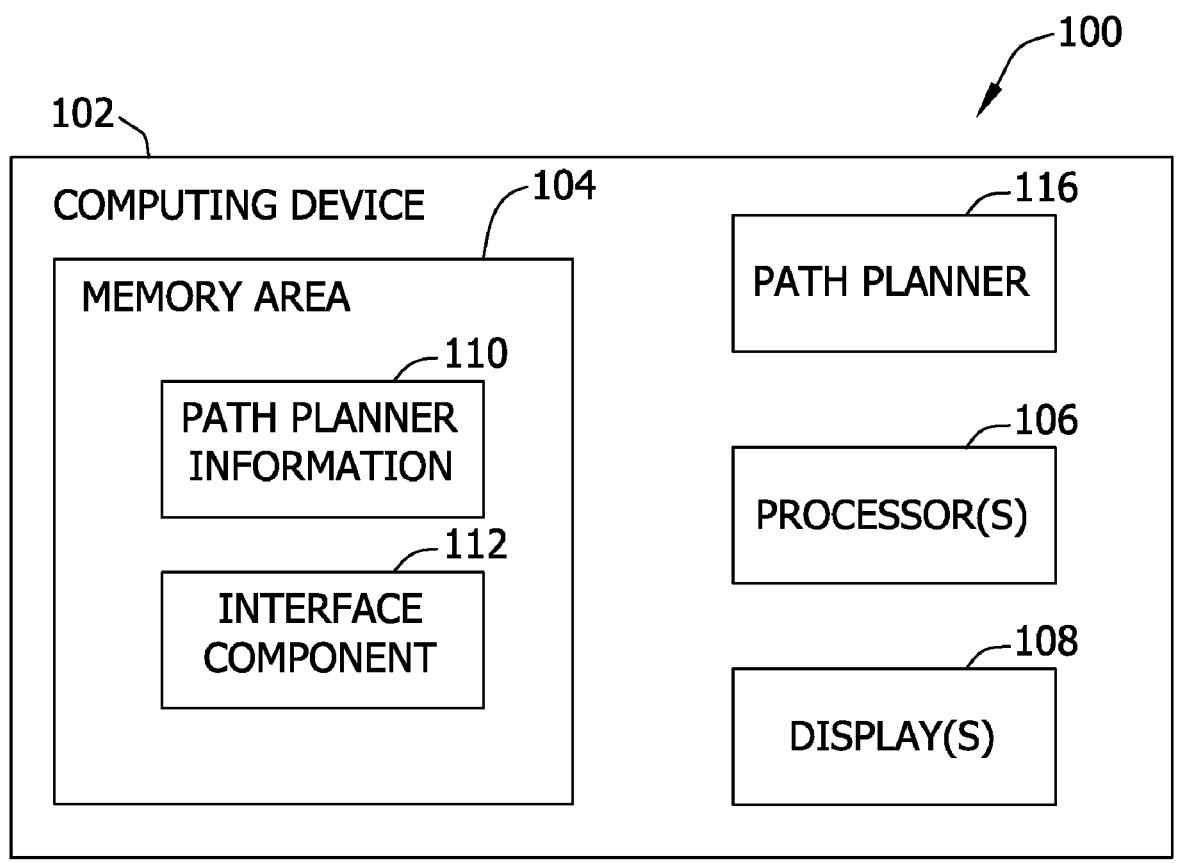
FIG. 1 is a block diagram illustrating an exemplary computing device having a memory area with at least one computer-executable component.

FIG. 1 shows a block diagram of a computing device 102 configured to map continuous time kinematic motion equations into a discrete time domain. Computing device 102 includes a memory area 104, one or more processors 106, one or more displays 108, and a path planner 116. Memory area 104 includes one or more computer-readable media. While illustrated as part of computing device 102, the computer-readable media may be external to computing device 102 yet coupled to computing device 102 (e.g., via a network). Further, any combination of elements illustrated as being stored on the computer-readable media may be stored on separate media.

Memory area 104, or any suitable computer-readable media, stores computer-executable components for calculating capacity utilization. In exemplary embodiments, memory area 104 includes, without limitation, an interface component 112. Memory area 104 further stores path planner information 110 including, without limitation, an initial time a path was planned and an initial condition of a plurality of segments in the path that are defined by discontinuities introduced by equations, for example, continuous time kinematic motion equations that generate command positions, velocity and acceleration based on, for example, initial and final conditions specified.

In one embodiment, path planner 116 maps a discrete time equation into a continuous time equation by breaking a path into a plurality of segments that are defined by discontinuities introduced by the equations and stored in memory area 104. In a particular embodiment, interface component 112 receives an indication that path planner 116 is currently called. Once path planner 116 is called, processor 106 may be configured to access a calculated value for an initial condition for each segment of the plurality of segments stored in memory area 104. For example, in a jerk constrained motion, a calculated value for a position, a velocity, and/or an acceleration at switching points (e.g., a switching point may be a point where an object that is not in motion "switches" to be in motion, and vice versa) may be accessed. A "jerk" is defined as a rate of change in acceleration or an acceleration slope. Thus, "jerk" is a derivative of acceleration. "Jerk" is an important variable in many applications where a smooth start is required. An example of a "jerk" is an elevator "shaking" when the elevator starts motion and when the elevator stops motion. This shaking is undesirable as a smooth start and stop is preferred. In one embodiment, segment switching points are virtualized so that the segment switching points are not constrained to an even sample period. Other modes that can be controlled with path planner 116 are derivatives of a "jerk," such as a snap. A further mode may be a derivative of a "snap," such as a "crackle," and yet another mode is a derivative of a "crackle," such as a "pop," each of which are terms well known in the art. This allows an ideal trajectory (e.g., a trajectory initially planned by the path planner) to be followed without having to modify the ideal trajectory such that the switching points are on a sample period. The result is a move that is completed in less overall time. Thus, there is an ability to navigate "virtual corners," (e.g., an end point of a calculated path that is greater than or less than an ideal end point of an ideal path). That is, an ability to have kinematic transition points (e.g., from a maximum acceleration to a non-maximum acceleration) in continuous-time, where a transition time does not fall on a discrete-time sample. For example, path planner 116 may have been run faster or slower than a sample period when a "virtual corner" is calculated and, therefore, an adjustment is needed to accommodate for the difference.

In one embodiment, processor 106 is further configured to access an initial path planned time, calculate an expired time between a current call to path planner 116 and a time that path planner 116 was last called, and utilize the expired time to determine a current location of, for example, a particular object associated with a motion event. In a further embodiment, the current location is related to a segment stored in memory area 104. Processor 106 is further configured to calculate a time that has expired within the segment related to the current location, and utilize the calculated time that has expired within the segment related to the current location and the initial condition for the segment related to the current location to generate an output command (e.g., a command for one of the following: a position, a velocity, an acceleration, and a jerk).

Figure 2:
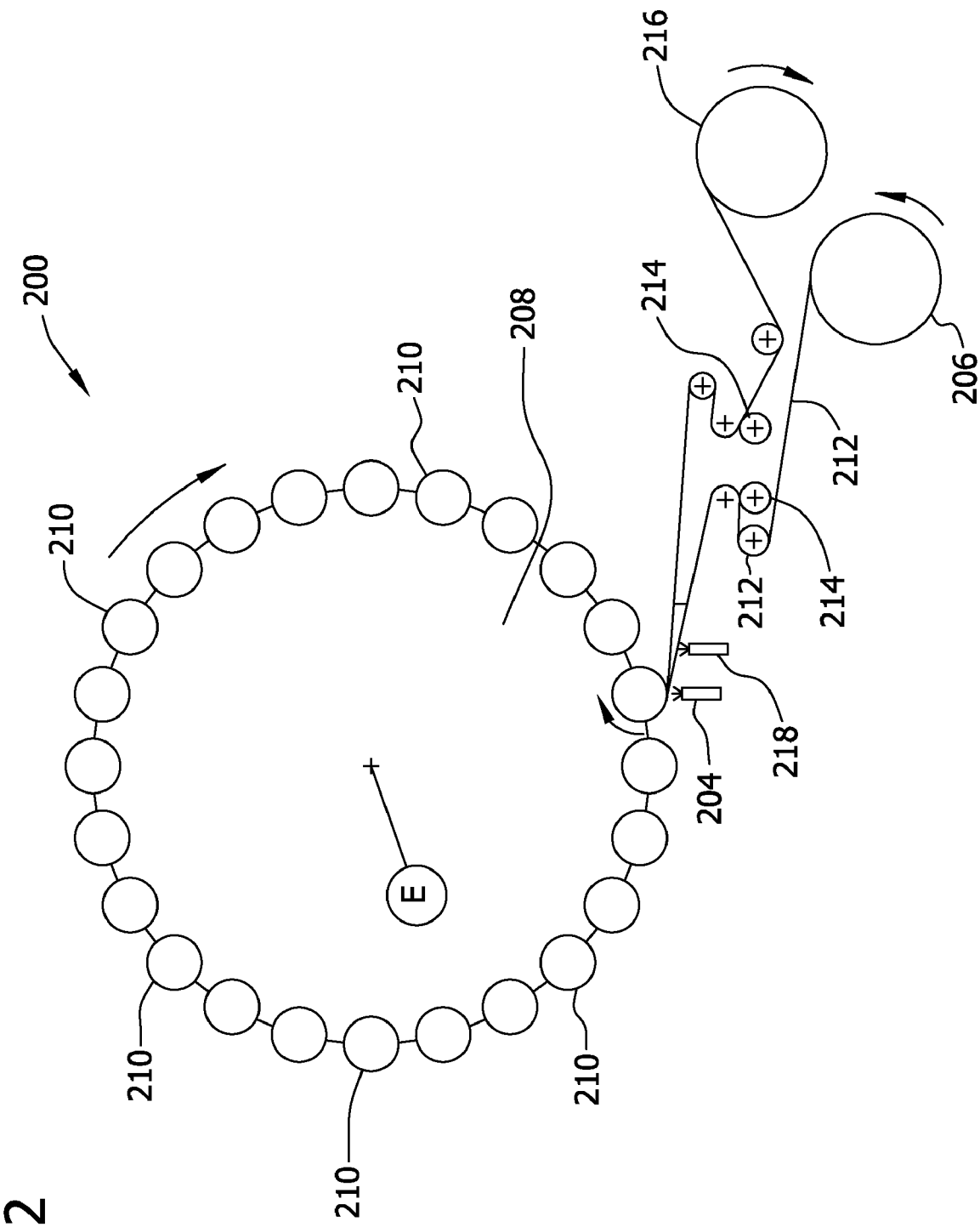
FIG. 2 is a diagram of an exemplary high speed labeling system.

For example, a method for mapping motion with a path planner, for example, path planner 116, is described with reference to a high speed labeling system 200, as shown in FIG. 2. However, the systems and methods described in the present disclosure are not limited in any way to labeling systems. One of ordinary skill in the art guided by the teachings herein provided will appreciate that the use of the high speed labeling system is exemplary in nature and in no way limits the scope of the present disclosure. For example, the systems and methods described herein are also applicable to pneumatic, magnetic, or any other motion system. In one embodiment, high speed labeling system 200 includes a feedback device or sensor 204, for example a bottle sensor, a label supply roll 206, a table master 208, an axis servo that drives rubber pinch rollers 214, a web waste roll 216, and a label edge sensor 218 suitable for applying labels to bottles 210. Table master 208 includes voids in which bottles 210 are positioned. Therefore, as table master 208 rotates in a clock wise direction, each bottle 210 rotates about a center axis of table master 208 at a speed established by table master 208. Rotating bottles 210 allows each bottle 210 to pass bottle sensor 204. Simultaneously while bottles 210 are being rotated by table master 208, label supply roll 206 supplies a label 212 to label edge sensor 218 via rubber pinch rollers 214. Rubber pinch rollers 214 move labels 212 from label supply roll 206 at a determined velocity to label edge sensor 218. With a bottle 210 positioned in front of bottle sensor 204, an indication is sent to label edge sensor 218 to apply label 212 corresponding to the one bottle 214 positioned with respect to bottle label sensor 204. Thereafter, a substrate to which removed label 212 was initially applied is collected by web waste roll 216 via rubber pinch rollers 214.

High speed labeling systems are configured to place a label on a bottle as fast and as accurately as possible. However, as mentioned above, there are problems with the conventional systems and methods. For example, in conventional high speed labeling systems that accumulate motion events (e.g., placing a label on a bottle) over a fixed sample period (e.g., 1 ms) may require a path planner to run every sample period. Therefore, if a conventional high speed labeling system prints information on a label (e.g., dates, codes, instructions, etc.) before the printed label is placed on a bottle, the printing of the label and a path planner planning a path for the printed label to be placed on the bottle may include time critical tasks that may be required to run every 1 ms for the high speed labeling system to work correctly. If the printing of the label requires more than 1 ms (e.g., 2 ms), the path planner, which is also required to run every 1 ms, will not run fast enough. Thus, in a conventional system, the line will continue to run but the number of bottles labeled per second is reduced if the process is slowed in order to compensate for the error. Therefore, because the path planner does not have an understanding of a sample period not occurring on a 1 ms interval, the path planner must wait for the next sample period before the path planner can attempt to plan a path, which, in this example, would occur in 1 ms. Thus, the path planner cannot run properly and the printed label will not be placed on the bottle in a timely manner. When a situation like this occurs in conventional motion systems, the process may need to be aborted as the high speed bottle labeling system is not working as efficiently as needed.

Figure 3:
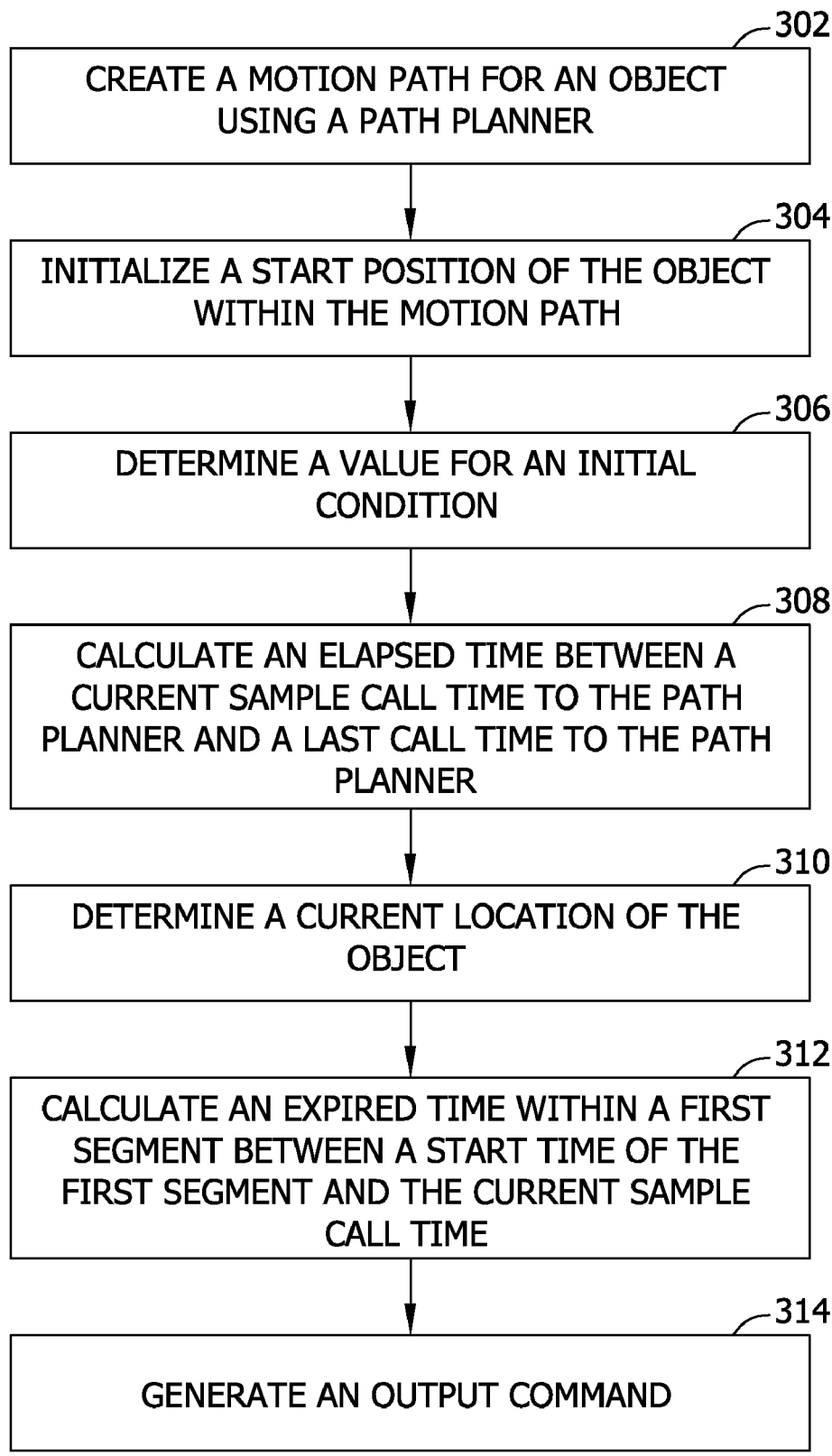
FIG. 3 is a flow diagram of an exemplary method for mapping motion with a path planner.

Referring further to FIG. 3, a method for mapping a motion of an object within a motion path defined by a path planner 116 will now be described with reference to FIG. 2. Although the methods described herein are with reference to a bottle labeling system, one of ordinary skill in the art guided by the teachings herein provided will appreciate that the method described herein can also be used with a variety of systems including, without limitation, systems for measuring motion without using information directly for control. At 302, a motion for a first object, for example label 212, using path planner 116 is created, which we will call the "ideal trajectory." At 304, a start position of the first object within the motion path is initialized. In one embodiment, the start time is initialized once sensor 204 identifies that one of bottles 210 has passed bottle sensor 204. In this embodiment, a bottle passing bottle sensor 204 may be defined as a motion event. At 306, a value for an initial condition for each segment of a plurality of segments in the motion path created by path planner 116 is determined. The initial condition for each segment may be one or more of a velocity of bottles 210, an acceleration required for label 212 to catch up to bottle 210 that has passed bottle sensor 204 on which a printed label is to be placed, and a position of one or more of bottles 210, for example.

The path planner 116 has the ability to plan a path having a non-standard time period, and thus labeling a bottle will either be less accurate in label placement and/or more acceleration is needed to allow a label speed to "catch up" to an ideal path. Either way, the ability to plan a path with flexibility necessary to support non-homogeneous sample periods allows for a number of bottles labeled per second to be maintained.

For exemplary purposes, it is assumed that the high speed bottle labeling system 200 supplies 400 bottles per minute (150 ms per bottle) with a bottle velocity of 1.67 m/sec ($V_b$=1.67 m/sec). Further, each bottle has a label spacing range of 3 mm to 10 mm with each label having a length range of 12 mm to 450 mm, and a label placement error of +/−0.5 mm ($D_{err}$=+/−0.5 mm). Therefore to calculate a sample induced time delay ($t_d$) (e.g., a minimum time needed for a motion of a printed label to start in order to stay within a label placement error to a avoid a label being misplaced on a bottle), the following equation is solved:

$$t_d = D_{err}/V_b \quad \text{Equation (1)}$$

Using the above values, $t_d$=0.5 mm/1.67 m/sec, or $t_d$= 2.994 μsec. Thus, to stay within the placement error of +/−0.5 mm, motion of the printed label starts every 2.994 μsec.

Referring again to FIG. 3, at 308, an elapsed time between a current sample call time to path planner 116 and a last call time to path planner 116 is calculated. Thus, if path planner 116 initially indicated that a printed label should be placed on a bottle 210 every 150 ms and therefore a sample induced time delay of 2.994 μsec is necessary in order to achieve proper placement of the printed label on the last bottle 210 to pass sensor 204, an amount of time exceeding 2.994 μsec is calculated. Path planner 116 utilizes this information regarding the elapsed time and the location of the last bottle 210 to have passed sensor 204 to determine a location of the last bottle 210 to pass sensor 204. At 310, if the calculated elapsed time is greater than or less than a sample period, a determination of a current location of a second object (e.g., bottle 210) in the motion path is made utilizing the calculated elapsed time. Thus, a current location of bottle 210 that has passed bottle sensor 204 is determined utilizing the calculated elapsed time. At 312, an expired time within the first segment between a start time of the first segment and the current sample call time is calculated. Path planner 116 utilizes this information regarding the expired time and the location of the last bottle to have passed sensor 204 to determined a path for a label 212, for example, a velocity needed to allow label 212 to catch up to the last bottle 210 to have passed sensor 204. At 314, an output command (e.g., the calculated velocity of the printed label) is generated utilizing, for example, the calculated expired time within the first segment and, in one embodiment, the start time for the first segment. In one embodiment, the execution of the generated output command alters the first motion path of label 212, for example. In a further embodiment, the execution of the generated output command creates a new motion path for label 212, for example. Thus, a new path is planned for label 112 by path planner 116 taking into consideration any expired time. In certain embodiments, once path planner 116 has planned the new path, the initial sample induced time delay of 2.994 μsec as determined above is used as a default thereafter. In alternative embodiments, path planner 116 calculates a new sample induced time delay based on current conditions of high speed labeling system 200.

Exemplary Operating Environment

A computing device, such as computing device 102 in FIG. 1, has one or more processors or processing units and a system memory. The computing device typically has at least some form of computer readable media. Computer readable media, which include both volatile and nonvolatile media, removable and non-removable media, may be any available medium that may be accessed by computer. By way of example and not limitation, computer readable media includes computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer/computing device. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory includes computer storage media in the form of removable and/or non-removable, volatile and/or nonvolatile memory. The computing device may operate in a networked environment using logical connections to one or more remote computers, such as a remote computer.

Although described in connection with an exemplary computing system environment, embodiments of the present disclosure are operational with numerous other general purpose or special purpose computing system environments or configurations. The computing system environment is not intended to suggest any limitation as to the scope of use or functionality of any aspect of the present disclosure. Moreover, the computing system environment should not be interpreted as having any dependency or requirement relating to any one or combination of components illustrated in the exemplary operating environment. Examples of well known computing systems, environments, and/or configurations that may be suitable for use with aspects of the present disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the present disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the present disclosure may be implemented with any number and organization of such components or modules. For example, aspects of the present disclosure are not limited to the specific computer-executable instructions or the specific components or modules illustrated in the figures and described herein. Other embodiments of the present disclosure may include different computer-executable instructions or components having more or less functionality than illustrated and described herein. Aspects of the present disclosure may also be practiced in distributed computing environments where tasks are performed by remote processing devices that are linked through a communications network. In a distributed computing environment, program modules may be located in both local and remote computer storage media including memory storage devices.

In operation, a computing device executes computer-executable instructions embodied in one or more computer-executable components stored on one or more computer-readable media to implement aspects of the present disclosure described and/or illustrated herein.

The order of execution or performance of the operations in embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

When introducing elements of aspects of the present disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the claimed subject matter, including the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for mapping a motion of a first object within a first motion path defined by a path planner based on a second motion path of a second object, the method comprising:
    creating the first motion path for the first object using the path planner;
    initializing a start position of the first object within the first motion path;
    determining a value for an initial condition for each segment of a plurality of segments in the first motion path created by the path planner;
    calculating an elapsed time between a current sample call time to the path planner and a last sample call time to the path planner;
    if the calculated elapsed time is one of greater than and less than a sample period, determine a current location of the second object in the second motion path utilizing the calculated elapsed time;
    calculating an expired time within a first segment of the plurality of segments between a start time of the first segment and the current sample call time; and
    generating an output command from the path planner, the execution of the generated output command altering the first motion path.

2. A method in accordance with claim 1, wherein the initial condition comprises one of the following: a jerk constrained motion, a calculated value for position, a velocity, and an acceleration value at switching points.

3. A method in accordance with claim 1, wherein the expired time is a time passed an initial set time for each segment.

4. A method in accordance with claim 3, wherein the start time is set by the path planner.

5. A method in accordance with claim 1, wherein the output command includes a command for one of the following: a position, a velocity, an acceleration, and a jerk.

6. A system for mapping continuous time kinematic motion equations into a discrete time domain, the system comprising:
   a memory area for storing path planner information including an initial time a first motion path was planned and an initial condition for each segment of a plurality of segments in the first motion path, the plurality of segments defined by discontinuities introduced by the continuous time kinematic motion equations; and
   a processor programmed to:
   create the first motion path for a first object using the path planner based on a second motion path of a second object;
   initialize a start position of the first object within the first motion path;
   determine a value for an initial condition for each segment created by the path planner;
   calculate an elapsed time between a current sample call time to the path planner and a last sample call time to the path planner;
   if the calculated elapsed time is one of greater than and less than a sample period, determine a current location of the second object in the second motion path utilizing the calculated elapsed time;
   calculate an expired time within a first segment of the plurality of segments between a start time of the first segment and the current sample call time; and
   generate an output command from the path planner, the execution of the generated output command altering the first motion path.

7. A system in accordance with claim 6, wherein the processor is further programmed to access a calculated value for an initial condition for each segment stored in the memory area.

8. A system in accordance with claim 6, wherein the processor is further programmed to access the initial time the path was planned.

9. A system in accordance with claim 6, wherein the initial condition is one of the following: a jerk constrained motion, a calculated value for a position, a calculated value for a velocity, and an acceleration value.

10. A system in accordance with claim 6, wherein the expired time within the first segment is a time passed an initial set time for the first segment.

11. A system in accordance with claim 10, wherein the initial set time is set by the path planner.

12. A system in accordance with claim 6, wherein the output command is a command for one of the following: a position, a velocity, an acceleration, and a jerk.

13. A computer readable medium storing a program instructing a computer to perform a method for mapping continuous time kinematic motion equations into a discrete time domain, the instructions comprising:
   creating a first motion path for a first object using a path planner;
   initializing a start position of the first object within the first motion path;
   determining a value for an initial condition for each segment of a plurality of segments in the first motion path created by the path planner;
   calculating an elapsed time between a current sample call time to the path planner and a last sample call time to the path planner;
   if the calculated elapsed time is one of greater than and less than a sample period, determining a current location of a second object in a second motion path utilizing the calculated elapsed time;
   calculating an expired time within a first segment of the plurality of segments between a start time of the first segment and the current sample call time; and
   generating an output command from the path planner, the execution of the generated output command altering the first motion path.

14. A computer readable medium in accordance with claim 13, wherein the initial condition is one of the following: a jerk constrained motion, a calculated value for a position, a velocity, and an acceleration value at a switching point.

15. A computer readable medium in accordance with claim 13, wherein the time that has expired within the plurality of segments is a time passed an initial set time for each segment.

16. A computer readable medium in accordance with claim 15, wherein the initial set time for each segment is set by the path planner.

17. A computer readable medium in accordance with claim 13, wherein the output command includes a command for one of the following: a position, a velocity, an acceleration, and a jerk.

* * * * *